Figure 1:
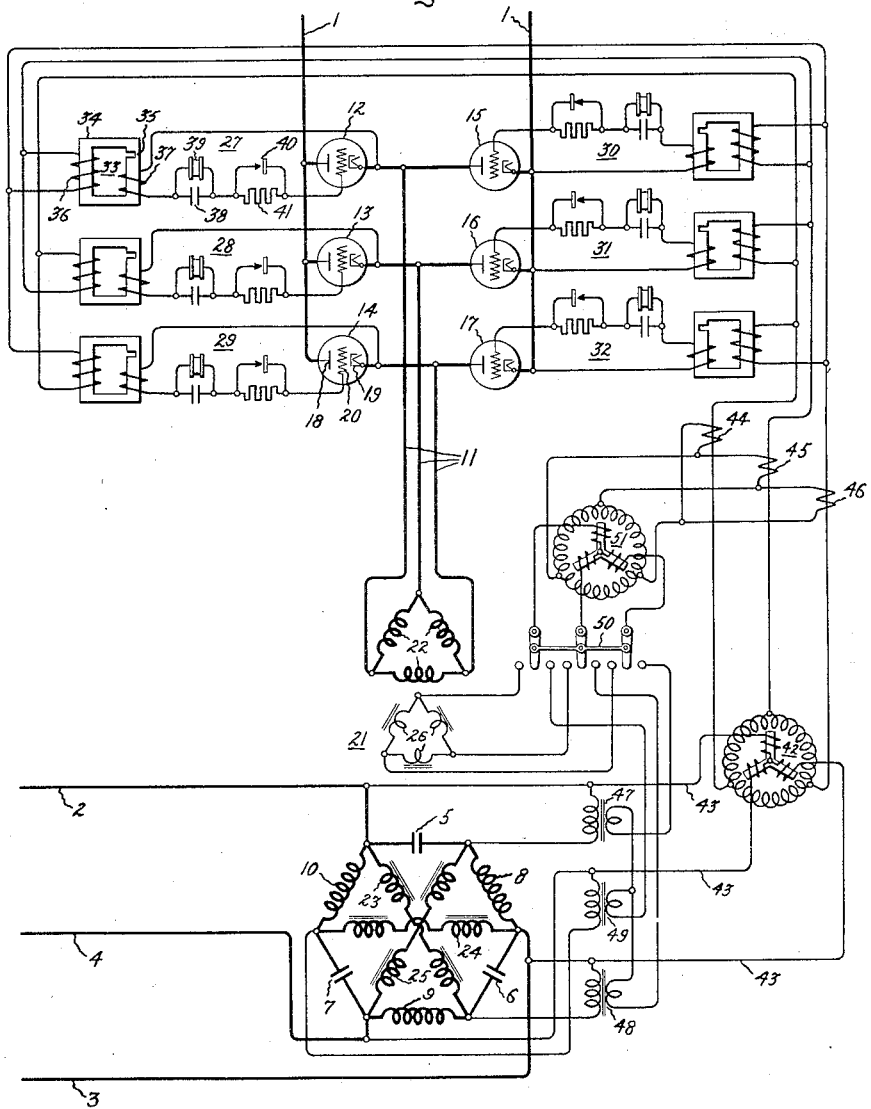

March 8, 1938. B. D. BEDFORD 2,110,656
ELECTRIC VALVE CIRCUIT
Filed Sept. 22, 1937 2 Sheets—Sheet 1

Inventor:
Burnice D. Bedford,
by Harry E. Dunham
His Attorney.

March 8, 1938.  B. D. BEDFORD  2,110,656
ELECTRIC VALVE CIRCUIT
Filed Sept. 22, 1937  2 Sheets-Sheet 2
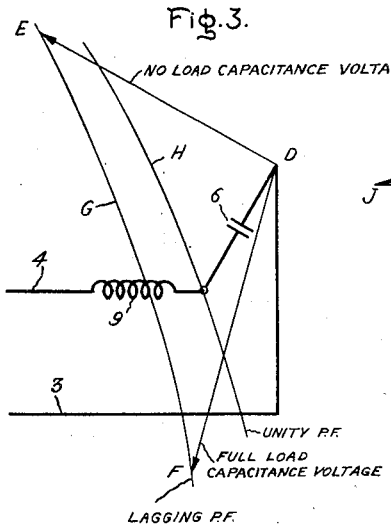
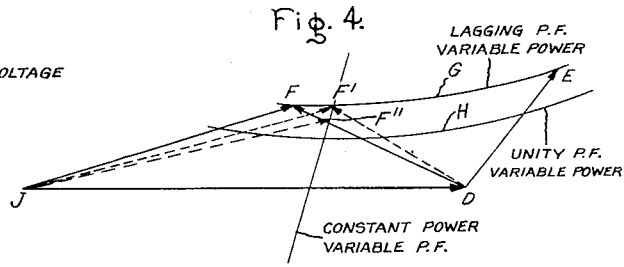
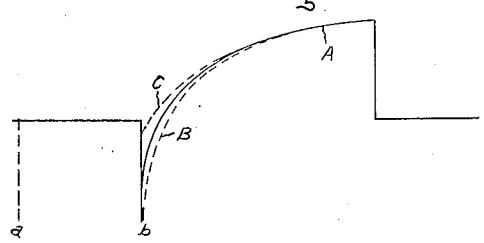
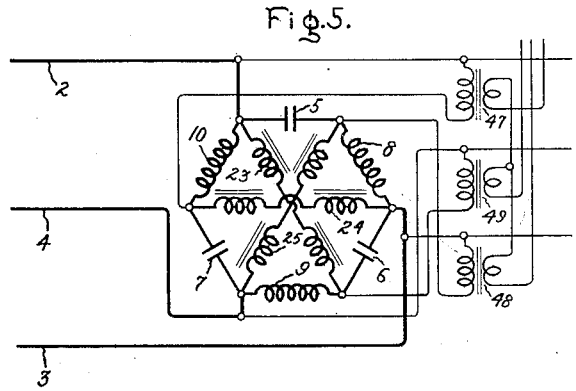
Inventor:
Burnice D. Bedford,
by Harry E. Dunham
His Attorney Patented Mar. 8, 1938

2,110,656

UNITED STATES PATENT OFFICE 2,110,656

ELECTRIC VALVE CIRCUIT

Burnice D. Bedford, Schenectady, N. Y., assignor to General Electric Company, a corporation of New York Application September 22, 1937, Serial No. 165,141

9 Claims. (Cl. 175—363)

My invention relates to electric valve circuits and more particularly to control or excitation circuits for electric valves used in electric power transmission and distribution systems of the type disclosed and claimed in United States Letters Patent 1,990,758 granted February 12, 1935 upon an application of C. W. Stone and assigned to the assignee of the present application.

In the control of electric valves, and particularly in the control of electric valves of the type employing ionizable mediums, in inverter circuits for transforming direct current to alternating current, it is important to maintain a predetermined commutating voltage and commutating angle so that the electric valves are afforded ample opportunity to deionize. As is well understood in connection with the operation of electric valve means employing ionizable mediums, the control member in general is ineffective to render the electric valve nonconductive after the electric discharge has been initiated or established. Therefore, it is important to impress on the anode a potential which is negative with respect to the cathode for a time equal to, or greater than, the time of deionization of the electric valve in order that the control member may regain control. By commutating voltage is meant the negative anode-cathode voltage which is impressed on an electric valve when another electric valve of the system is rendered conductive. If the value of commutating voltage is sufficiently large, and if the time of application of the negative anode voltage is of sufficient duration, the control member or grid of the electric valve is afforded an opportunity to regain control to maintain the electric valve nonconductive after the anode becomes positive in potential relative to the cathode. There has been evidenced a decided need for improved excitation circuits for electric valve apparatus used in inverter circuits to produce adequate commutating voltage and angle under transient load conditions and under conditions occasioned by system disturbances and irregularities. Furthermore, in systems of the type described in the Stone patent it has been found desirable in many instances to control the electric valve inverter to transmit energy at a constant power factor to an associated constant voltage alternating current circuit.

It is an object of my invention to provide a new and improved electric valve circuit.

It is another object of my invention to provide a new and improved control or excitation circuit for electric valve apparatus employed in constant current systems.

It is a further object of my invention to provide a new and improved excitation circuit for electric valve inverters.

It is a still further object of my invention to provide a new and improved excitation circuit for electric valve transmission systems of the type described and claimed in the above identified patent of C. W. Stone.

In accordance with the illustrated embodiment of my invention, I provide an excitation or control circuit for electric valve apparatus employed in an electric power transmission or distribution system of the type disclosed and claimed in the above mentioned patent of C. W. Stone in which energy is transmitted between a constant current-direct current circuit and a constant voltage-alternating current circuit through electric valve means and a monocyclic network including serially connected reactances of opposite sign, such as inductances and capacitances. The improved excitation circuit which I provide controls the phase of the resultant alternating voltage impressed on control members of the electric valve means in accordance with a component of voltage derived from the monocyclic network. I have found that the several voltages of a monocyclic network may be combined with a component of voltage of fixed phase position to produce an alternating voltage of variable phase relationship to control the conductivities of the various electric valves to maintain a predetermined commutating voltage and angle during transient load conditions and during disturbances.

For a better understanding of my invention, reference may be had to the following description taken in connection with the accompanying drawings and its scope will be pointed out in the appended claims. Fig. 1 of the accompanying drawings diagrammatically illustrates an embodiment of my invention as applied to an electric power transmission system for transmitting power between a constant current direct current circuit and a constant voltage alternating current circuit, and Figs. 2, 3, and 4 represent certain operating characteristics thereof. Fig. 5 represents a modification of the arrangement shown in Fig. 1, and Fig. 6 represents certain operating characteristics of the arrangement shown in Fig. 5.

Referring to Fig. 1 of the accompanying drawings, my invention is diagrammatically illustrated as applied to an electric power transmission or distribution system for transmitting power between a constant current direct current circuit 1 and a constant voltage alternating current circuit including conductors 2, 3, and 4. A monocyclic network including a plurality of branches of serially connected reactances of opposite sign, such as capacitances 5, 6, and 7 which are respectively connected in series with inductances 8, 9, and 10, is employed to transform alternating current of constant value of circuit 11 to constant voltage alternating current, or vice versa. It will be noted that alternate junctures of the reactances of opposite sign are connected to the conductors 2, 3, and 4 of the constant voltage alternating current circuit. Electric valves 12–17, inclusive, are connected to the constant current direct current circuit 1 and act in conjunction with the elements of the monocyclic network to transform the constant current direct current to constant voltage alternating current. The electric valves 12–17, inclusive, are preferably of the type employing an ionizable medium, such as a gas or a vapor, and each includes an anode 18, a cathode 19 and a control means or member 20.

As an agency for transmitting power between the monocyclic network and electric valves 12–17, and as an expedient for increasing the apparatus economy of the elements of the monocyclic network, I employ an inductive network such as a transformer 21 having primary windings 22, secondary windings 23, 24, and 25, and tertiary windings 26. It will be noted that the secondary windings 23, 24 and 25 are each connected between one of the alternate junctures which is connected to a conductor of the constant voltage alternating current circuit, and that the other terminals of the respective secondary windings are connected to alternate junctures of reactances of opposite sign which are connected in series relation across a phase of the constant voltage circuit having a voltage component perpendicular to the voltage impressed on the first terminals of the secondary windings. This arrangement is disclosed and claimed in my copending patent application Serial No. 97,011 filed August 20, 1936 and assigned to the assignee of the present application.

The feature of introducing in the excitation circuits the constant current voltage to maintain a predetermined range of commutating angle or voltage is described and claimed in a copending patent application Serial No. 165,090 of C. H. Willis, filed concurrently herewith and assigned to the assignee of the present application.

I employ a plurality of excitation or control circuits 27–32 which are associated with electric valves 12–17, respectively. Since the excitation circuits are similar, only excitation circuit 27 associated with electric valve 12 will be described in detail. Each of the excitation circuits 27–32 may include a transformer 33, for impressing on the associated control member 20 an alternating voltage of peaked wave form, and may include a core member 34 provided with a restricted saturable portion 35, a primary exciting winding 36 and a control winding 37 in which there is induced an alternating voltage of peaked wave form. A self-biasing type of circuit including a parallel connected capacitance 38 and a resistance 39 may be connected in series relation with the control member 20 of the associated electric valve to impress on the control member 20 a negative unidirectional biasing potential. If desired, the resistance 39 may be of a material having a nonlinear impedance-current characteristic, such as that disclosed and claimed in U. S. Patent 1,822,742 granted September 8, 1931 upon an application of Karl B. McEachron and assigned to the assignee of the present application. A parallel connected unidirectional conducting device 40 and a noninductive impedance element 41 are connected in series relation with the control member 20 and serve to provide a relatively low impedance path to the flow of normal control member current. Due to the unidirectional conducting characteristics of the device 40, the impedance of the excitation circuit will be substantially greater to the flow of grid current occasioned by the deionization of the associated electric valves.

The excitation circuits 27–32 may be energized from any suitable source of alternating current of predetermined phase position, and in the arrangement shown in Fig. 1 the excitation circuits are shown as being energized from the constant voltage alternating current circuit, including conductors 2, 3, and 4, through any conventional phase shifting arrangement such as the rotary phase shifter 42. The rotary phase shifter 42 is connected to conductors 2, 3, and 4 through conductors 43. I have found that various voltages of the monocyclic network when combined with an alternating voltage of fixed phase position serve to produce an alternating voltage of variable phase which controls the conductivities of the electric valves 12–17 to maintain a predetermined or requisite commutating voltage and angle. The voltage which is combined with the alternating voltage of fixed phase position and magnitude may be combined in series relation therewith, and I may accomplish this result by employing suitable transformers 44, 45, and 46 which introduce alternating voltages in series relation with the alternating voltage output of the rotary phase shifter 42. In the arrangement illustrated in Fig. 1, I have chosen to show a system in which I use the voltages appearing across the capacitances 5, 6, and 7 as the agency for controlling the resultant voltages impressed on control members 20 of electric valves 12–17. In accordance with the teaching of the above mentioned Willis application, the constant current voltage of the monocyclic network may be employed by utilizing the voltages appearing across the terminals of tertiary windings 26 of transformer 21. Transformers 47, 48, and 49 may be connected across the terminals of capacitances 5, 6, and 7, respectively, to obtain the desired voltage magnitude transformation. Any suitable circuit controlling means, such as a switch 50, may be employed for utilizing the voltages appearing across the capacitances 5, 6, and 7 or for utilizing the constant current voltage of tertiary windings 26. Any conventional phase shifting arrangement, such as the rotary phase shifter 51, may be interposed between the transformers 47–49 and tertiary windings 26 to control the phase of the voltages introduced in excitation circuits 27–32 by transformers 44–46.

The general principles of operation of the embodiment of my invention will be explained by considering the electric power transmission system diagrammatically shown in Fig. 1 when energy is being transmitted from the constant current direct current circuit 1 to the constant voltage alternating current circuit including conductors 2, 3, and 4. As will be well understood by those skilled in the art, the electric valves 12–17 are rendered conductive periodically and in a predetermined order to effect transformation of the constant current direct current to alternating current of constant value, and supply the alternating current of constant value to primary winding 22 of transformer 21. The monocyclic network including capacitances 5, 6, and 7 and inductances 8, 9, and 10, which are energized by secondary windings 23, 24, and 25, transform the alternating current of constant value to constant voltage alternating current. The monocyclic network operates to effect this transformation in a manner well understood by those skilled in the art.

By the proper adjustment of the rotary phase shifter 42, which is energized from the constant voltage alternating current circuit, the phase of the alternating voltages impressed on the control members 20 of electric valves 12–17, inclusive, may be adjusted to have a predetermined phase relationship to cause the electric valves to operate as inverters. This phase relationship may range from a phase displacement of slightly less than 180 electrical degrees lagging with respect to the anode voltage to any phase relationship in the third and fourth quadrants. When the switch 50 is in the right-hand position there is introduced in the excitation circuits 27–32 alternating voltages derived from capacitances 5, 6, and 7 which control the phase of the resultant voltages impressed on control members 20. More particularly, there is introduced in series relationship with the voltages produced by rotary phase shifter 42, alternating voltages which control the phase of the alternating voltages impressed on primary windings 36 of the transformers 33 in excitation circuits 27–32. When the switch 50 is moved to the left-hand position there are introduced in the excitation circuits alternating voltages which vary in accordance with the constant current voltage, which also controls the phase of the resultant voltages impressed on control members of electric valves 12–17.

The operating characteristics represented in Figs. 2, 3, and 4 will be considered in explaining the operation of the embodiment of my invention shown in Fig. 1. Curve A may be employed to represent the anode-cathode voltage of one of the electric valves, for example electric valve 12. During the time a—b the electric valve 12 may be considered as conducting current and at time b the current is commutated from electric valve 12 to one or the other electric valves, and the anode potential of the valve 12 is temporarily reduced below that of the associated cathode to afford time for the valve to deionize. The dotted curve B represents that condition in which the commutating angle is increased, and the dotted curve C represents that condition under which the commutating angle is decreased. Of course, under the condition as represented by curve B, the electric valve 12 is afforded a greater opportunity to deionize and thereby permits greater opportunity for the control member 20 to regain control.

In Fig. 3 I have represented certain operating characteristics of one branch of the monocyclic network of Fig. 1. The capacitance 6 and the inductance 9 are shown connected across conductors 3 and 4 of the constant voltage alternating current circuit. Vector DE represents the voltage appearing across the terminals of the capacitance 6 under no-load conditions, and the vector DF represents the voltage of the capacitor 6 under full load conditions. Curves G and H represent the loci of the voltage of capacitance 6 under varying load conditions for a lagging power factor condition and for a unity power factor condition, respectively. If it be assumed that the load connected to the constant voltage alternating current circuit is inductive, the capacitive voltage may be considered to follow the locus as represented by curve G. In Fig. 4 the curves and vectors of Fig. 3 have been assigned like identifying characters, but are shown in different positions to facilitate explanation. The vector JD may be employed to represent the component of alternating voltage introduced in the excitation circuit by the rotary phase shifter 42 from the constant voltage circuit, and the vector DF, of course, represents the capacitance voltage which is introduced in the excitation circuits when the switch 50 is in the right-hand position. Therefore, the resultant voltage impressed on the control member 20 of electric valve 12 will be the vector sum JF. It will be noted that as the vector DF rotates clockwise about the point D, the resultant voltage impressed on control members 20, as represented by the dotted vector JF', is retarded in phase and, of course, is retarded with respect to the alternating voltage of the associated phase of the constant voltage system of voltages. Furthermore, the resultant voltage impressed on the control members 20 of electric valves 12–17 varies in phase in accordance with the power and in accordance with the power factor. For example, if the power or load transmitted by the system decreases from a value corresponding to the point F to a value corresponding to the point F', the resultant voltage impressed on the control members 20 will be changed in phase to the position JF', thereby increasing the commutating angles and voltages of the electric valves. If the power factor of the system changes, incurring incident changes in commutating angle and voltage, the resultant voltages impressed on the control members will vary in phase tending to maintain the commutating angle and voltage within a predetermined range of values. For example, if the power factor of the constant current alternating current circuit decreases from a value corresponding to the point F' to a value corresponding to the point F'', the resultant voltages impressed on the control members will be retarded to the position JF'' thereby increasing the commutating voltages and angles and tending to restore these relations to the predetermined desired range of values. Since transient variations in power or power factor conditions tend to rotate the capacitance voltage to control the resultant voltage impressed on the control members 20, the commutating angle and voltage will be controlled to assure stable operation of the electric valve. It is to be noted that whereas commutating angle and voltage are increased in constant potential systems by advancing the phase position of the voltage impressed on the control members, in constant current systems of the monocyclic type retardation of the voltages impressed on the control members effects an increase in commutating voltage and angle.

When the switch 50 is moved to the left-hand position there will be introduced in the excitation circuits 27–32 voltages which vary in accordance with the constant current voltage of the monocyclic network which is provided by the tertiary windings 26 of transformer 21. It has been found that these voltages may be combined with the output voltages of the rotary phase shifter 42 to impress on the control members 20 of electric valves 12–17 resultant alternating voltages which vary in phase to control the commutating angle and commutating voltage of the electric valves under transient and disturbance conditions.

Fig. 5 of the accompanying drawings diagrammatically illustrates a modification of the arrangement of Fig. 1 and corresponding elements have been assigned like reference numerals. In the arrangement of Fig. 5, the transformers 47, 48, and 49 are shown as being connected across the inductances 10, 8, and 9, respectively. The voltages provided by the inductances 8, 9, and 10 may also be employed to control the phase of the resultant voltages impressed on control members 20 to maintain the commutating voltage and angle of the electric valve means 12–17 at substantially constant values or within a range of values under transient or disturbance conditions. The operation of the arrangement shown in Fig. 5 is substantially the same as that explained above in connection with the arrangement of Fig. 1. Fig. 6 represents the relationship of the voltages employed when the inductance voltages are used to control the alternating voltages impressed on the control members. Vector KL may be employed to represent the alternating voltage introduced in the excitation circuit by the rotary phase shifter 42, and vectors LM and LN represent, respectively, the inductance voltages at no-load and full load. Vector KN, which is the vector sum, is the resultant voltage impressed on the control member of one of the electric valves, as for example electric valve 12. As the load on the system temporarily decreases due to irregular operation of the system, the vector LN, representing the inductance voltage, rotates counterclockwise about the point L to retard the voltage impressed on the control member 20 to the position represented by vector KN', thereby increasing the commutating voltage and angle and maintaining positive operation of the electric valves.

If the power factor of the constant current alternating current circuit changes, involving incident changes in commutating angles and voltages of the electric valves, the resultant voltages impressed on the control members 20 will be retarded in phase tending to restore the commutating angles and voltages to the predetermined ranges of values. For example, if the power factor of the constant current alternating current circuit decreases from the value indicated by the point N to the point N'', the resultant voltages impressed on the control members 20 will be retarded in phase to the position KN'', thereby tending to increase the commutating angles and voltages to restore these factors to the predetermined desired range of values. It is to be understood that when the voltages of the inductances in the monocyclic networks are employed, the resultant voltages impressed on the control members also vary conjointly in accordance with the power and the power factor of the system. For practical purposes, it is to be noted that the variation in phase of the control voltage in accordance with variations in power factor conditions is an important factor. Since the commutating voltage and angle are related to the power factor at which power is transmitted to the constant voltage circuit, it is to be understood that by maintaining a predetermined commutating angle and voltage, the power factor is also maintained constant. This feature is of importance where it is desired to transmit power at constant power factor.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a constant current direct current circuit, a constant voltage alternating current circuit, electric valve means connected to said direct current circuit, said electric valve means having control means for controlling the conductivity thereof, a monocyclic network including serially connected reactances of opposite sign connected between said electric valve means and said constant voltage alternating current circuit for transforming constant voltage alternating current into alternating current of constant value, and an excitation circuit for impressing on said control means a voltage which varies in accordance with the voltages of reactances of like sign.

2. In combination, a constant current direct current circuit, a constant voltage alternating current circuit, electric valve means connected to said direct current circuit and a monocyclic network including serially connected reactances of opposite sign for transforming constant current direct current into constant voltage alternating current, said electric valve means having control means for controlling the conductivity thereof, and an excitation circuit for energizing said control means comprising means energized in accordance with an electrical condition of one of said reactances for impressing on said control means a voltage to control the commutating voltage of said electric valve means.

3. In combination, a constant current direct current circuit, a constant voltage alternating current circuit, electric valve means connected to said direct current circuit, a monocyclic network connected between said electric valve means and said constant voltage circuit and including serially connected reactances of opposite sign for transforming constant voltage alternating current into alternating current of constant value, said electric valve means having control means for controlling the conductivity thereof, and an excitation circuit for energizing said control means comprising means responsive to an electrical condition of one of said reactances for controlling the commutating voltage of said electric valve means.

4. In combination, a constant voltage alternating current circuit, a constant current direct current circuit, a monocyclic network including serially connected reactances of opposite sign and an electric valve means connected between said circuits to effect transfer of energy therebetween, said electric valve means having a control member for controlling the conductivity thereof, an excitation circuit for impressing on said control member a control voltage, and means responsive to an electrical condition of one of said reactances for controlling said voltage to control the power factor at which power is transmitted to or received from said constant voltage circuit.

5. In combination, a constant voltage alternating current circuit, a constant current direct current circuit, a monocyclic network comprising a plurality of branches of serially connected reactances of opposite sign, a plurality of electric valves connected between said network and said direct current circuit to effect transfer of energy therebetween, each of said electric valves having a control member for controlling the conductivity thereof, excitation circuits for impressing on said control members alternating voltages, and means for introducing in said excitation circuits voltages which vary in accordance with the voltages of the reactances of like sign to control the phase of said alternating voltages.

6. In combination, a constant voltage alternating current circuit, a constant current direct current circuit, a monocyclic network including a plurality of branches of serially connected inductances and capacitances for transforming constant voltage alternating current into alternating current of constant value, a plurality of electric valves connected between said monocyclic network and said direct current circuit, each electric valve having a control member for controlling the conductivity thereof, a plurality of excitation circuits for impressing on the control members alternating voltages variable in phase, and means for introducing in the various excitation circuits voltages derived from said inductances for controlling the phase of the alternating voltages to control the power factor at which power is transmitted to or received from the constant voltage alternating current circuit.

7. In combination, a constant voltage alternating current circuit, a constant current direct current circuit, a monocyclic network including a plurality of branches of serially connected inductances and capacitances to transform constant voltage alternating current into alternating current of constant value, a plurality of electric valves connected between said monocyclic network and said direct current circuit, each electric valve having a control member for controlling the conductivity thereof, and a plurality of excitation circuits for impressing on the control members alternating voltages variable in phase comprising means for producing components of voltage fixed in phase and means responsive to the voltages of said capacitances for controlling the phase of said alternating voltages.

8. In combination, a constant voltage alternating current circuit, a constant current direct current circuit, a monocylic network connected to said constant voltage alternating current circuit and comprising serially connected capacitances and inductances for transforming constant voltage alternating current to alternating current of constant value, electric valve means connected between said monocyclic network and said direct current circuit for transforming constant current alternating current into direct current of constant value, said electric valve means having a control member for controlling the conductivity thereof, an excitation circuit energized from said constant voltage alternating current circuit for impressing an alternating voltage on said control member, and means for introducing in said excitation circuit a component of voltage derived from one of said capacitances to control the phase of said alternating voltage.

9. In combination, a constant current direct current circuit, a constant voltage alternating current circuit, an electric translating circuit comprising electric valve means connected to said direct current circuit, a monocyclic network connected to said constant voltage circuit and including serially connected reactances of opposite sign and an inductive network including a primary winding connected to said electric valve means, a secondary winding connected to said monocyclic network and a tertiary winding, said electric valve means having a control member for controlling the conductivity thereof, an excitation circuit energized from said constant voltage alternating current circuit for impressing on said control member an alternating voltage, and means energized from said tertiary winding for introducing in said excitation circuit a voltage to control the phase of said alternating voltage.

BURNICE D. BEDFORD.